United States Patent Office 3,228,904
Patented Jan. 11, 1966

3,228,904
STABILIZATION OF SYNTHETIC POLYMERS
Roger E. Morris, Cuyahoga Falls, Ray D. Taylor, Brecksville, and Robert J. Fawcett, Cuyahoga Falls, Ohio, assignors to The B. F. Goodrich Company, New York, N.Y., a corporation of New York
No Drawing. Filed May 3, 1962, Ser. No. 192,080
15 Claims. (Cl. 260—29.7)

This invention relates to the stabilization of synthetic polymers with certain water insoluble complexing agents and more particularly pertains to the stabilization of olefinically unsaturated synthetic rubbery polymers with certain water insoluble amino acids and to the novel stabilized rubbery products themselves.

The stabilization of rubber and particularly unvulcanized rubber against oxidative attack or stiffening which normally occurs upon aging by the incorporation therein of a water soluble complexing or chelating agent and an antioxidant is known. In U.S. Patent No. 2,667,522, for instance, is described and claimed such a composition. The compositions described and claimed in the aforementioned patent are used as pressure sensitive adhesives and it is desirable not to have them cure or become stiff. This reference teaches that the water-soluble chelating agents are added to the rubber to be stabilized on the mill.

The present invention is distinguished from the disclosure of the aforementioned prior art patent in that we add our complexing or chelating agent to an aqueous synthetic rubber latex prior to the coagulation step and the subsequently coagulated and water washed rubber shows remarkable stability even at elevated temperatures. It has been found that water-soluble chelating agents such as those taught by the prior art are ineffective in our process probably because they are leached from the coagulated rubber during the coagulation and washing steps. On the other hand, all water insoluble chelating agents are not operative in our invention.

We have discovered a process for stabilizing synthetic rubbery polymers against degradation caused by oxygen and other atmospheric elements, said process comprising adding to an aqueous dispersion of a synthetic rubbery polymer a small amount of at least one compound having the structure

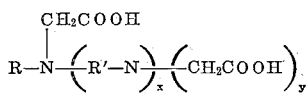

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2.

The synthetic rubbery polymers embodied herein include all rubbery polymers of conjugated diolefins and particularly rubbery homopolymers and interpolymers of butadiene-1,3 hydrocarbons such as butadiene-1,3 itself, isoprene, piperylene, 2,3-dimethyl butadiene-1,3, 2-ethylbutadiene-1,3, hexadiene-1,3, 4-methyl-1,3-pentadiene, and the like and halogenated dienes such as chloroprene, bromoprene and fluoroprene. The preferred diolefins are butadiene-1,3, isoprene, piperylene, and 2-halogenated butadiene-1,3.

In addition to the rubbery homopolymers and copolymers of the aforementioned conjugated diolefins, the interpolymers of one or more of the conjugated diolefins and up to about 50% by weight of at least one other monomer copolymerizable therewith are included within the scope of the present invention. The preferred other monomers are monovinyl monomers and these include the monovinyl aromatic monomers having from 8 to 18 carbon atoms, the vinyl cyanides having from 3 to 10 carbon atoms and acrylic monomers having the structure

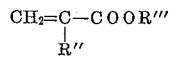

wherein R" is a member selected from the group consisting of hydrogen, an alkyl group having from 1 to 6 carbon atoms, a halogen and a cyano group, and R''' is a hydrocarbon group having from 1 to 12 carbon atoms.

Illustrative monovinyl aromatic monomers embodied in the synthetic rubbery polymers of this invention are styrene, alpha-methyl styrene, the vinyl toluenes, the alpha-methyl vinyl toluenes, the vinyl xylenes and the like and others.

Illustrative vinyl cyanides useful in the present invention include acrylonitrile, methacrylonitrile, ethacrylonitrile, vinylidene cyanide, maleic dinitrile, and the like.

Illustrative acrylic monomers embodied herein are methyl acrylate, ethyl acrylate, the propyl acrylates, the butyl acrylates, the amyl acrylates, the hexyl acrylates, cyclohexyl acrylate, phenyl acrylate, the octyl acrylates and the dodecyl acrylates, methyl methacrylate, ethyl methacrylate, cyclohexyl methacrylate, dodecyl methacrylate, ethyl alpha-cyano acrylate, ethyl-alpha-bromo acrylate, and the like. Most preferred of the acrylic monomers are the lower acrylic and methacrylic acid esters having from 4 to 7 carbon atoms.

The preferred synthetic rubbery polymers for this invention are those composed of units derived from the polymerization of a mixture of (1) from about 50 to 100% by weight of a conjugated diolefin and (2) from 0 to about 50% by weight of at least one member selected from the group consisting of styrene, acrylonitrile and a lower acrylate ester having from 4 to 7 carbon atoms. In the above-described proportions of monomers it is to be understood that when a maximum of one monomer is employed that the relative proportions of the remaining monomers must be adjusted so that the combined weight percentage of monomers used in any single polymer will total substantially 100%.

The complexing agents, chelating agents, or stated differently, the compounds capable of forming coordination complexes with polyvalent metals, embodied herein are all substantially insoluble in water, they are soluble in or compatible with conjugated diolefin rubbers and they all conform to the structure

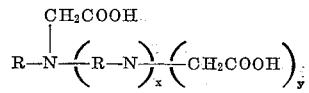

wherein R, R', $x$ and $y$ each has the aforementioned designation. Illustrative specific compounds falling into this class are the following:

$C_6H_{13}$—$N(CH_2COOH)_2$
$C_7H_{15}$—$N(CH_2COOH)_2$
$C_8H_{17}$—$N(CH_2COOH)_2$
$C_{12}H_{25}$—$N(CH_2COOH)_2$
$C_{14}H_{29}$—$N(CH_2COOH)_2$
$C_{20}H_{41}$—$N(CH_2COOH)_2$

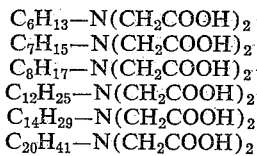

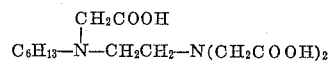

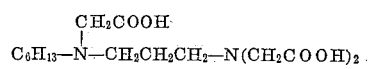

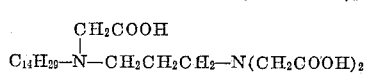

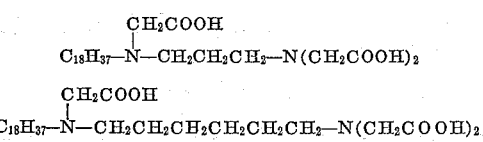

$$C_{18}H_{37}-N-CH_2CH_2CH_2CH_2CH_2CH_2-N(CH_2COOH)_2$$

Although the water insoluble chelating agents of this invention are effective per se in the stabilization of the synthetic rubbery polymers embodied herein, it is often desirable to include a conventional rubber antioxidant in the rubber and such inclusion is within the scope of the present invention. Normally the aqueous latex or the dispersion of the synthetic rubbery polymer which is to be protected against atmospheric deterioration will include an antioxidant which is preferably of the aromatic phenol and hindered aromatic phenol type which are well known in the art.

The aqueous latices and dispersions of synthetic rubbery polymer embodied herein are prepared by methods well known in the art. For instance, a rubbery copolymer of about 75% by weight of butadiene-1,3 and 25% by weight of styrene is prepared in an aqueous medium in the presence of a suitable polymerization catalyst in the range of from about 15 to 40% total solids. The aqueous medium may be emulsifier free or it may contain an emulsifier. Suitable emulsifiers include conventional alkali metal soaps, sulfates and sulfonates such as sodium lauryl sulfate, the alkali metal salts of petroleum or paraffin oils, the sodium salts of aromatic sulfonic acids such as the sodium salt of naphthalene sulfonic acid, the sodium salts of dodecane-1-sulfonic acid, octadecane-1-sulfonic acid, etc., aralkyl sulfonates such as sodium isopropyl benzene sulfonate, sodium dodecyl benzene sulfonate and sodium isobutyl naphthalene sulfonate; alkali metal salts of sulfonate dicarboxylic acid esters and amides such as sodium dioctyl sulfosuccinate, sodium N-octadecyl sulfosuccinamate, and the like, and others. The so-called cationic emulsifiers such as the salts of strong inorganic acids and organic bases containing long carbon chains, for example, lauryl amine hydrochloride, the hydrochloride of diethylaminoethyldecylamine, trimethyl cetyl ammonium bromide, dodecyl trimethyl ammonium bromide, the diethylcyclohexylamine salt of cetyl sulfuric ester, and others also may be used. Preferred, however, are the alkali metal salts of long chain carboxylic acids and alkali metal salts of aromatic sulfonic acids and the sodium salts of aralkyl sulfonates. In addition to the above and other polar or ionic emulsifiers, still other materials which may be used, singly or in combination with one or more of the above-mentioned types of emulsifiers, include the so-called "non-ionic" emulsifiers such as the polyether alcohols prepared by condensing ethylene oxide with higher alcohols, the fatty alkylolamine condensates, the diglycol esters of lauric, oleic and stearic acids, and others. It is also often desirable to add post-polymerization emulsifiers to the latices for improved latex stability.

The catalyst, required for satisfactory polymerization rate, may be any of those commonly employed for the polymerization of butadiene hydrocarbons including the various peroxygen compounds such as hydrogen peroxide, benzoyl peroxide, pelargonyl peroxide, cumene hydroperoxide, tertiary butyl hydroperoxide, 1-hydroxy-cyclohexyl hydroperoxide, tertiary butyl diperphthalate, tertiary butyl perbenzoate, sodium, potassum and ammonium persulfate and others. Particularly preferred are the water-soluble peroxygen compounds such as hydrogen peroxide and the sodium, potassium and ammonium persulfate, the water-soluble oxidation-reduction or "redox" types of catalysts, and the heavy metal activated, water-soluble peroxygen and redox catalysts. Included in the list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a diazomercapto compound and a water-soluble ferricyanide compound and others. Generally from 0.01 to 3 parts by weight of catalyst per 100 parts by weight of monomers is employed in the polymerization reaction.

The antioxidants useful in conjunction with the water-insoluble chelating agents embodied herein are all the well-known rubber antioxidants such as those types disclosed in the "Encyclopedia of Chemical Technology" by Kirk and Othmer, Interscience Encyclopedia, Inc., New York, vol. 2, pages 69–75, vol. 11, pages 881–887 and in the First Supplement Volume, pages 85–88.

Rubber antioxidants, and particularly those useful in synthetic rubbers, are usually needed to prevent degradation caused by shelf aging, oxidation aided by metal catalysts, the effects of heat and light, the effects caused by flexing and by exposure to the atmosphere. The chemically important rubber antioxidants fall into two main classes: amines and their derivatives and phenols and their derivatives. The power, as antioxidants, of members of each class is approximately the same, but essential difference lie in their effectiveness in the presence of carbon black and in the degree of staining imparted to vulcanizates on exposure to light. Antioxidants probably function in rubber much as they do in other autooxidizable materials to act as chain-stoppers, transfer agents, and peroxide decomposers. Some of the most commonly used antioxidants in the rubber industry are phenolics such as 2,6-di-tert-butyl-p-cresol, 2,2'-methylene-bis(4-methyl-6-tert-butyl phenol), 1,5-dihydroxynaphthalene, 4,4'-thiobis(3-methyl-6-tert-butyl phenol), 4,4'-dihydroxy-diphenyl, 4,4' - butylidenebis(3-methyl-6-tert-butyl phenol); amines such as the alkylated and aralkylated diphenyl amines, phenyl-1 and 2-naphthylamines; carbonyl-amine reaction products such as the reaction products of aniline and acetaldehyde, diphenylamine and acetone, phenyl-2-naphthylamine and acetone; and heterocyclics such as 2-mercaptobenzimidazole and 5,5'-dimethylacridan. Also included herein are the new phenolic antioxidants having the structure

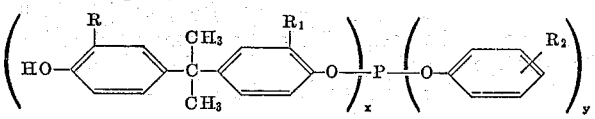

wherein R represents a bulky hydrocarbon group such as t-butyl, t-amyl, t-hexyl, cyclohexyl, t-pentyl, t-octyl, phenyl and the like; $R_1$ represents hydrogen and R; $R_2$ represents an alkyl group having from 6 to 20 carbon atoms which is preferably in the meta or para position; $x$ represents a number of from 1 to 3 inclusive; $y$ represents a number of from 0 to 2 inclusive and the sum of the numerical value of $x+y$ is always exactly 3, which are disclosed and claimed in the copending patent application of Roger E. Morris and Ray D. Taylor, Serial No. 139,587, filed September 21, 1961 now U.S. Pat. No. 3,112,286.

Non-staining characteristics are important in white or light-colored rubber products. The phenolic antioxidants are superior to the amines for this purpose and the phenolic antioxidants are preferred in the present invention.

The rubber soluble chelating agents embodied herein may be incorporated into the rubber which is to be stabilized in any of the conventional ways such as by mill-mixing, mixing in an internal mixer such as the Banbury, by adding the chelating agent to the rubber latex, dispersion or cement. Most preferred in the present invention is to add the water-insoluble chelating agent to the rubber latex and even more preferred is to mix the water-insoluble chelating agent with the antioxidant and add this mixture to the latex. It is often convenient to emulsify in water a mixture of the water-insoluble chelating agent and antioxidant and then to add the emulsion directly to the rubber latex. The resulting stabilized latex can then be coagulated, washed and dried in the stabilized condition.

In the practice of the present invention it is desirable to use from about 0.1 to about 5 parts by weight per 100 parts by weight of rubber of combined phenolic antioxidant-rubber soluble chelating agent and it is preferred to use a ratio of from 0.5 to 10% by weight of the rubber-soluble chelating agent and from 99.5 to 90% by weight of the phenolic antioxidant in the aforementioned combined antioxidant-chelating agent.

The present invention will be further illustrated by the following examples wherein the amounts of the various ingredients are expressed in parts by weight unless otherwise indicated.

PREPARATION OF CHELATING AGENTS

Dodecyliminodiacetic acid was prepared as follows: Chloracetic acid (1.1 mole) in 800 ml. of ethanol was neutralized by the addition of 125 ml. of 10 N aqueous sodium hydroxide. Dodecyl amine (0.5 mole) was added to the mixture and the solution was heated to 80° C. and the pH was maintained at from 8 to 10 by the gradual addition of more 10 N sodium hydroxide solution until the theoretically required amount of sodium hydroxide had been added. The reaction mixture was then brought to room temperature and the dodecyliminodiacetic acid was precipitated by bringing the pH of the mixture to 2 with concentrated hydrochloric acid. The product was isolated by filtration and was washed twice with distilled water and dried to a constant weight of 141.3 g. (94% of theory).

In a similar manner octadecyliminodiacetic acid was prepared.

A chelating agent having the structure

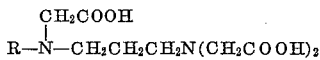

wherein R is a mixture of alkyl groups having an average of 13 carbon atoms was prepared as follows: Chloroacetic acid (2.24 moles) in 400 ml. of methanol was neutralized with 31% NaOH solution. Duomeen CD

wherein R is a mixture of alkyl groups having an average of 13 carbon atoms, 0.25 mole) was added, the reaction mixture was brought to 70–73° C. and the pH of the reaction mixture was maintained at 8–10 by the addition of more 31% NaOH solution until the pH became fairly constant for a period of time. The mixture was cooled and the product was precipitated with hydrochloric acid (pH of 2). The solid was isolated by filtration, was washed and dried. In a similar manner chelating agents of the formula

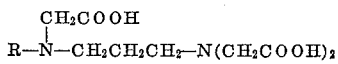

wherein R averages from 17 to 18 carbon atoms were prepared starting with Duomeen S and with Duomeen T. The Duomeens are marketed by the Armour Company.

*Example I*

To 2000 g. of a 20% total solids latex of a butadiene-styrene rubber containing about 23.5% by weight of rubber of bound styrene prepared at 5° C. in a 50–50 mixed fatty acid-rosin acid soap recipe was added an emulsion of 5 g. of stabilizer in 50 g. of 2½% aqueous soap (sodium stearate) solution. The resulting latex was then diluted with distilled water to 10% total solids and the rubber was coagulated with salt-acid treatment. The rubber crumbs were washed free of salt and acid with distilled water. The 4 minute Mooney viscosities of these rubbers were then determined after various intervals of oven aging at 105° C. in a circulating air oven. The phenolic antioxidant used in this example has the structure

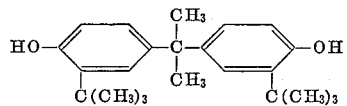

| Stabilizer | 4 min. Mooney Viscosity, days at 105° C. | | | | |
|---|---|---|---|---|---|
| | None (original) | 1 | 2 | 4 | 6 |
| Phenolic antioxidant | 49 | 47 | 56 | 74 | 88 |
| Phenolic antioxidant plus 3% by weight of C₁₂H₂₅H(CH₂COOH)₂ | 49 | 50 | 46 | 52 | 62 |
| Phenolic antioxidant plus 3% disalicylidene Propylene diamine | 49 | 52 | 62 | 73 | 87 |

The disalicylidene propylene diamine is a known water insoluble chelating agent which obviously is inoperative and outside the scope of this invention. The substitution of octadecyliminodiacetic acid for the dodecyliminodiacetic acid above gave comparable results.

*Example II*

The procedure described in Example I was followed except that the butadiene-styrene rubber was one prepared in a fatty acid soap recipe at 50° C. The phenolic antioxidant used in this example has the structure

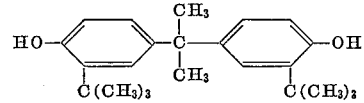

| Stabilizer | 4 min. Mooney Viscosity days at 105° C. | | | | |
|---|---|---|---|---|---|
| | None | 1 | 2 | 4 | 6 |
| Phenolic antioxidant | 50 | 46 | 58 | 72 | 71 |
| Phenolic antioxidant plus 3 percent HO—CH₂CH₂\N—CH₂CH₂N(CH₂COOH)₂ /HOOC—CH₂ | 51 | 46 | 58 | 65 | 69 |
| Phenolic antioxidant plus 10 percent HO—CH₂CH₂\NCH₂CH₂N(CH₂COOH)₂ /HOOC—CH₂ | 49 | 44 | 54 | 65 | 69 |
| Phenolic antioxidant plus 3 percent C₁₂H₂₅N(CH₂COOH)₂ | 50 | 46 | 45 | 41 | 42 |
| Phenolic antioxidant plus 1 percent C₁₂H₂₅N(CH₂COOH)₂ | 51 | 43 | 39 | 45 | 50 |

It is apparent that water soluble chelating agents, as exemplified by

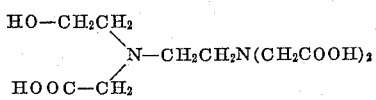

are not operative and are not within the scope of the present invention. Similarly ethylene diamine tetraacetic acid (EDTA) when combined with the phenolic antioxidant and incorporated into the rubber latex showed no improvement over that obtained with the phenolic antioxidant alone.

*Example III*

The procedure of Example II was repeated using a different batch of the butadiene-styrene latex. The phenolic antioxidant used in this example has the structure

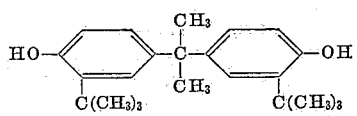

The substitution of a chelating agent having the structure

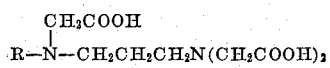

wherein R averages from 17 to 18 carbon atoms for the chelating agent shown above gave comparable results.

We claim:
1. The rubbery composition resistant to atmospheric degradation comprising a mixture of a synthetic rubbery polymer of at least 50% by weight of a conjugated diene having from 4 to 6 carbon atoms and the remainder another monomer copolymerizable with said diene and a small but effective amount sufficient to protect said rubbery polymer against degradation by oxygen of at least one compound having the structure

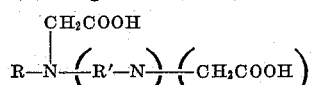

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2.

| Stabilizer | 4 min. Mooney Viscosity, days at 105° C. | | | | |
|---|---|---|---|---|---|
| | None | 1 | 2 | 4 | 6 |
| Phenolic antioxidant | 49 | 46 | 58 | 71 | 75 |
| Phenolic antioxidant plus 3 percent $C_{13}H_{27}N$—$CH_2COOH$ / $CH_2CH_2CH_2N(CH_2COOH)_2$ | 46 | 45 | 39 | 39 | 42 |

*Example IV*

The procedures of the preceding examples were repeated using a butadiene-styrene rubber latex prepared at 5° C. in a fatty acid soap recipe.

| Stabilizer | 4 min. Mooney Viscosity, Days at 105° C. | | | | |
|---|---|---|---|---|---|
| | None | 1 | 2 | 4 | 6 |
| [2,4-di(alpha-methyl benzyl)phenol] | 45 | 51 | 60 | 70 | 78 |
| 2,4-di(alpha-methyl benzyl)phenol plus 3 percent $C_{13}H_{27}$—N($CH_2COOH$)—$CH_2CH_2CH_2N(CH_2COOH)_2$ | 44 | 44 | 45 | 52 | 58 |
| HO-phenyl-C(CH₃)(C(CH₃)₃)-phenyl-O-P-(O-phenyl-C₉H₁₉)₂ | 47 | 41 | 41 | 55 | 57 |
| HO-phenyl-C(CH₃)(C(CH₃)₃)-phenyl-O-P-(O-phenyl-C₉H₁₉)₂ plus 3 percent $C_{13}H_{27}$—N($CH_2COOH$)—$CH_2CH_2CH_2N(CH_2COOH)_2$ | 44 | 43 | 42 | 43 | 44 |
| 0.03 percent $C_{13}H_{27}$—N($CH_2COOH$)—$CH_2CH_2CH_2$—N($CH_2COOH$)$_2$ (based on 100 parts of rubber) | 53 | 58 | 63 | 67 | 83 |
| No stabilizer | 51 | 65 | 76 | 93 | 103 |

2. The stable composition comprising a mixture of a rubbery synthetic homopolymer of a conjugated diolefin and a small but effective amount sufficient to protect said rubbery polymer against degradation by oxygen of at least one compound having the structure

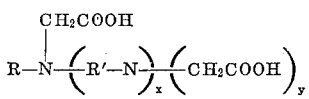

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2.

3. The stable composition comprising a mixture of 100 parts by weight of a synthetic rubbery polymer composed of units derived from the polymerization of a mixture of (1) from about 50 to 100% by weight of a conjugated diolefin and (2) from 0 to about 50% by weight of at least one monomer selected from the group consisting of styrene, acrylonitrile, and a lower acrylate ester having from 4 to 7 carbon atoms and from about 0.1 to 5 parts by weight based on the rubbery polymer of (3) a phenolic antioxidant and (4) a compound having the structure

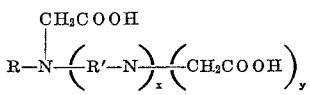

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2.

4. The stable composition comprising a mixture of 100 parts by weight of a synthetic rubbery polymer composed of units derived from the polymerization of a mixture of (1) from about 50 to 100% by weight of butadiene-1,3 and (2) from 0 to 50% by weight of at least one number selected from the group consisting of styrene, acrylonitrile, and a lower acrylate ester having from 4 to 7 carbon atoms and from about 0.1 to 5 parts by weight based on the rubbery polymer of (3) a phenolic antioxidant and (4) a compound having the structure

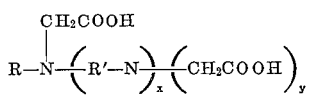

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2, said (3) and (4) being present in a weight ratio of from 0.05:9.95 to 1:9 respectively.

5. The stable composition comprising a mixture of 100 parts by weight of a synthetic rubbery polymer composed of units derived from the polymerization of a mixture of (1) from about 50 to 100% by weight of butadiene-1,3 and (2) from 0 to 50% by weight based on the rubbery polymer of styrene and from 0.1 to 5 parts by weight based on said rubbery polymer of (3) a phenolic antioxidant and (4) a compound having the structure

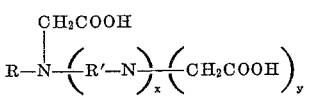

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ 1, $y$ is 2, said (3) and (4) being present in a weight ratio of from 0.05:9.95 to 1:9 respectively.

6. The stable composition comprising a mixture of 100 parts by weight of a synthetic rubbery polymer composed of units derived from the polymerization of a mixture of (1) about 77% butadiene-1,3 and (2) about 23% styrene and from 0.1 to 5 parts by weight based on said rubbery polymer of (3) a phenolic antioxidant and (4) a compound having the structure

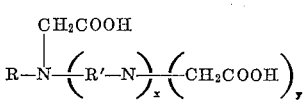

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2, said (3) and (4) being present in a weight ratio of from 0.05:9.95 to 1:9 respectively.

7. The composition of claim 6 wherein R is an alkyl group having 12 carbon atoms, $x$ is 0 and $y$ is 1.

8. The composition of claim 6 wherein R is an alkyl group having an average of 13 carbon atoms, R' is an alkylene group having 3 carbon atoms, $x$ is 1 and $y$ is 2.

9. An aqueous latex of the composition of claim 1.

10. The method for preparing a stable synthetic rubbery polymer of at least 50% by weight of a conjugated diene and the remainder a monomer copolymerizable with said diene comprising adding to an aqueous latex of a synthetic rubbery polymer a small but effective amount sufficient to protect said rubbery polymer against degradation by oxygen of a compound having the structure

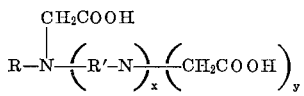

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2 and then coagulating, washing and drying the rubbery product.

11. The method for preparing a stable synthetic rubbery polymer comprising adding to an aqueous latex containing 100 parts by weight of a synthetic rubbery polymer composed of units derived from the polymerization of a mixture of (1) from about 50 to 100% by weight of a conjugated diolefin and (2) from 0 to about 50% by weight of at least one member selected from the group consisting of styrene, acrylonitrile, and a lower acrylate ester having from 4 to 7 carbon atoms, from about 0.1 to 5 parts by weight based on said rubbery polymer of (3) a phenolic antioxidant and (4) a compound having the structure

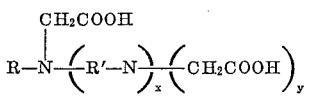

wherein R is a hydrocarbon group having from 6 to 20 carbon atoms, R' is an alkylene group having from 2 to 10 carbon atoms, $x$ is a number of from 0 to 1, $y$ is a number of from 1 to 2, when $x$ is 0, $y$ is 1 and when $x$ is 1, $y$ is 2 and then coagulating, washing and drying the rubbery product.

12. The method of claim 11 wherein the conjugated diolefin is butadiene-1,3.

13. The method of claim 11 wherein the weight ratio of (3) to (4) is from 0.05:9.95 to 1:9 respectively.

14. The method of claim 11 wherein (2) is styrene.

15. The composition of claim 6 wherein R is an alkyl group having 16–18 carbon atoms, $x$ is 1 and $y$ is 2.

(References on following page)

References Cited by the Examiner

UNITED STATES PATENTS

| | | | |
|---|---|---|---|
| 1,380,640 | 6/1921 | Davidson | 260—814 |
| 2,240,957 | 5/1941 | Munz | 252—152 |
| 2,413,856 | 1/1947 | Bersworth | 260—534 |
| 2,667,522 | 1/1954 | McElroy | 260—314 |
| 2,804,474 | 8/1957 | Lew | 260—534 |

OTHER REFERENCES

Schildknecht: "Polymer Process," vol. X, pp. 152–153, Interscience Publishers, Inc., N.Y.

MURRAY TILLMAN, *Primary Examiner.*
WILLIAM H. SHORT, *Examiner.*
J. ZIEGLER, *Assistant Examiner.*